United States Patent [19]
Ware

[11] Patent Number: 6,035,574
[45] Date of Patent: Mar. 14, 2000

[54] FISHING LURE

[76] Inventor: Brett Ware, 606 Arbor Dr., Denton, Kans. 66017

[21] Appl. No.: 09/197,907

[22] Filed: Nov. 23, 1998

[51] Int. Cl.$^7$ .................................................. A01K 85/00
[52] U.S. Cl. ...................... 43/42.06; 43/42.31; 43/42.37; 43/42.39
[58] Field of Search .............................. 43/42.06, 42.31, 43/42.39, 42.35, 42.1, 42.37

[56] References Cited

U.S. PATENT DOCUMENTS

| | | |
|---|---|---|
| 923,670 | 6/1909 | Lockhart . |
| 2,538,459 | 1/1951 | Kasmeyer . |
| 2,766,544 | 10/1956 | Silverthorne . |
| 2,878,611 | 3/1959 | Netherton . |
| 3,507,070 | 4/1970 | Rossello . |
| 3,521,394 | 7/1970 | Wintersberger . |
| 3,744,174 | 7/1973 | Lund ........................................ 43/42.06 |
| 3,905,147 | 9/1975 | Snipes ........................................ 43/17.1 |
| 4,098,017 | 7/1978 | Hall ........................................ 43/42.06 |
| 4,102,075 | 7/1978 | Wagner ........................................ 43/17.1 |
| 4,438,583 | 3/1984 | Sullivan ........................................ 43/42.06 |
| 4,453,335 | 6/1984 | Smith ........................................ 43/42.31 |
| 4,823,503 | 4/1989 | Tesch ........................................ 43/42.04 |
| 4,835,897 | 6/1989 | Rudolph ........................................ 43/42.06 |
| 5,915,944 | 6/1999 | Strunk ........................................ 43/42 |

*Primary Examiner*—Jack W Lavinder
*Attorney, Agent, or Firm*—Brett J. Trout; Brown, Winick, Graves, Gross, Baskerville and Schoenebaum, P.L.C.

[57] ABSTRACT

A fishing lure for producing vibrations of a pre-determined frequency to attract fish. The fishing lure is provided with a streamlined body to substantially eliminate sound generating turbulence as the fishing lure is pulled through the water. The body is also provided with a shaft passing through the body to cause water passing through the shaft to generate vibrations of a pre-determined frequency known to attract fish. A hook is securely fastened to the body to reduce excess noise otherwise associated with the hook contacting the body.

19 Claims, 4 Drawing Sheets

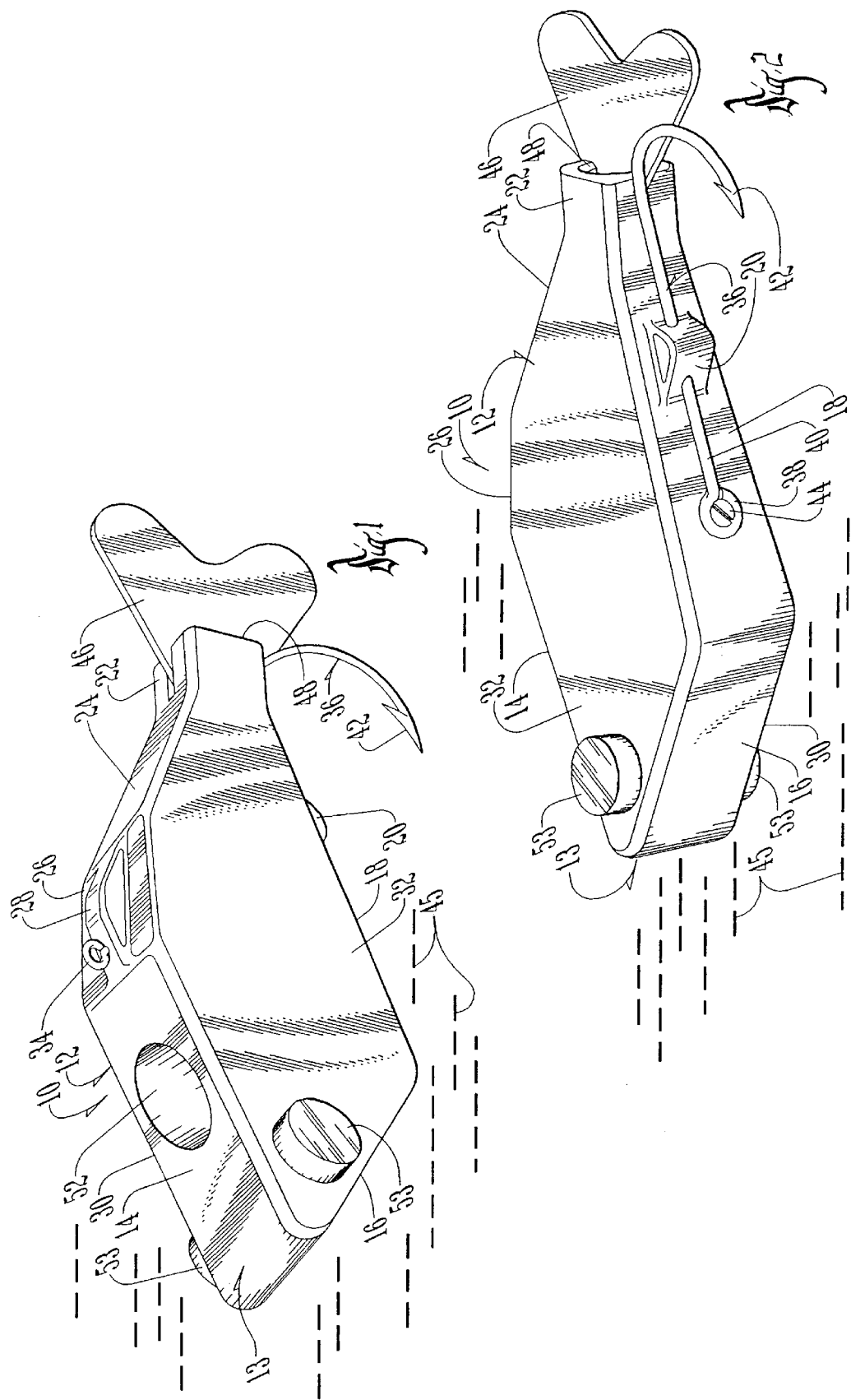

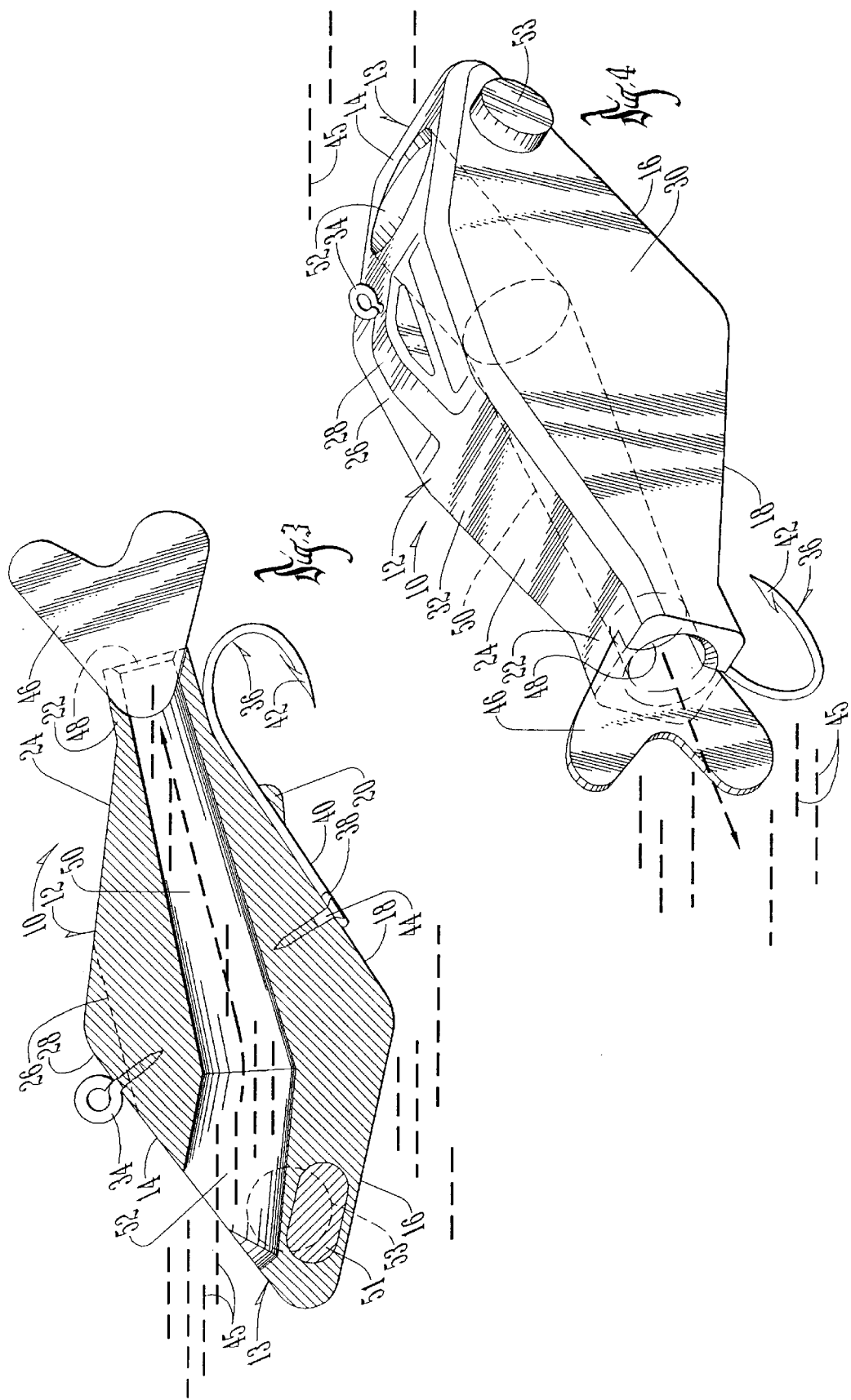

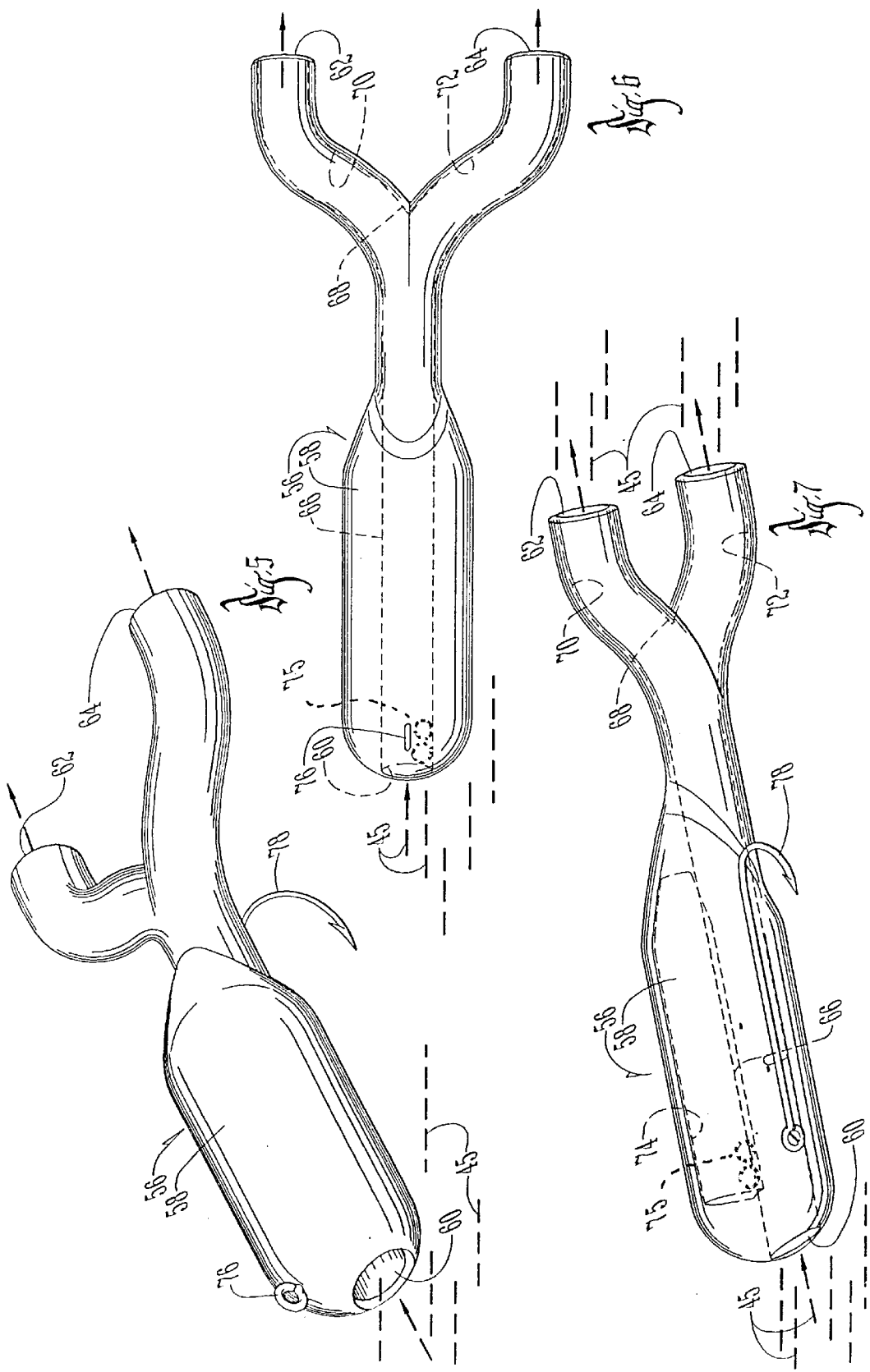

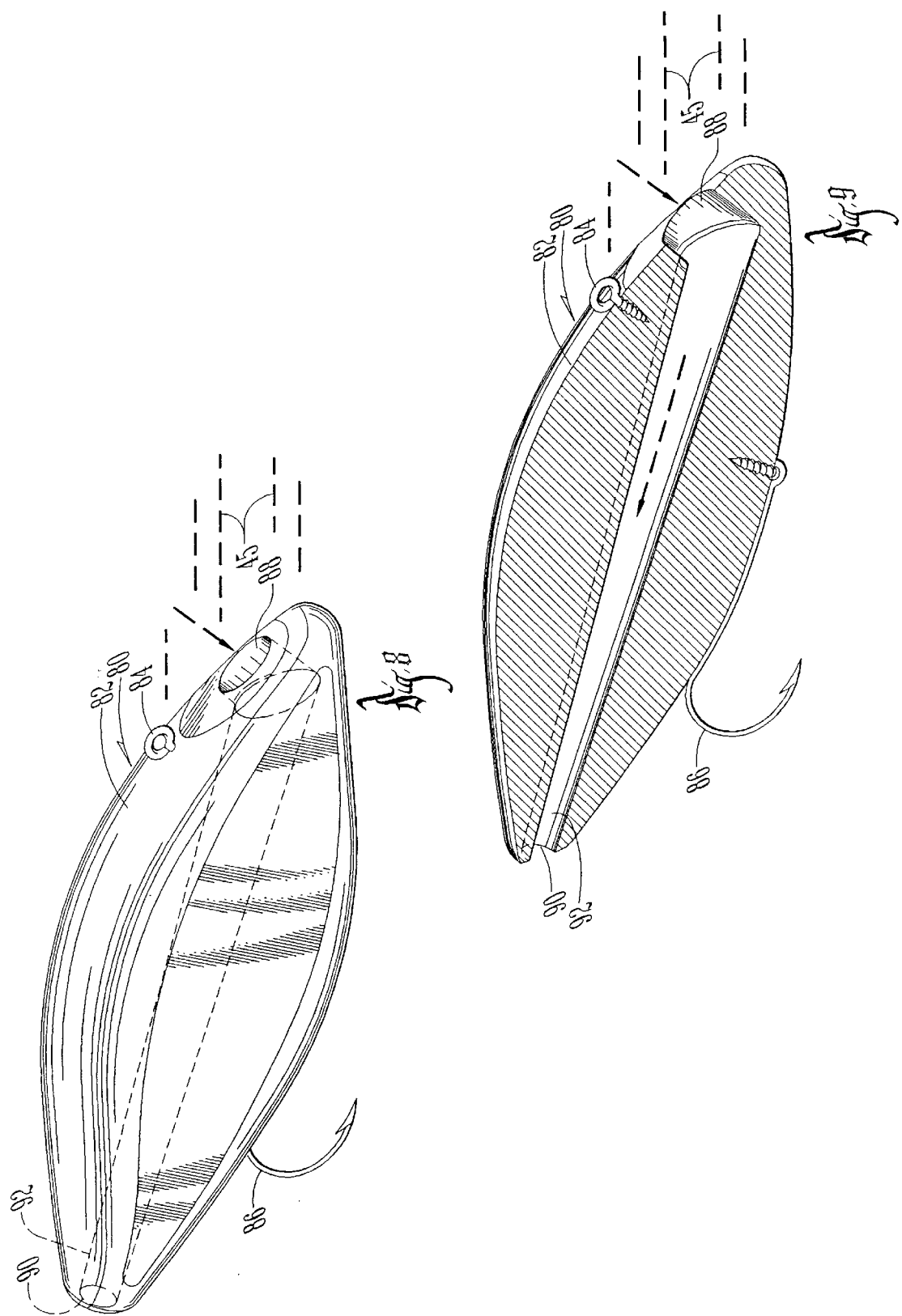

FISHING LURE

BACKGROUND OF THE INVENTION

1. Field of the Invention

The present invention relates to a fishing lure and, more particularly, to a fishing lure with a body designed to reduce vibrational turbulence of water passing over the body, and to cause water passing through the body to generate vibrations of a predetermined frequency.

2. Description of the Prior Art

It is well known in the art to provide a fishing lure which generates sound as water is drawn through the lure. One type of lure designed to produce audible sounds from water passing through the lure is described by Joseph M. Smith in U.S. Pat. No. 4,453,335. The Smith lure describes a ball positioned within a flow of water passing through the lure. As the water passes through the lure, the ball rattles back and forth against the lure to produce a vibrational sound designed to attract fish. Another type of audible lure is described by Joe Hall in U.S. Pat. No. 4,098,017. The Hall patent describes a lure having several channels used to disperse water throughout the body of the lure. A third device, described by Anthony Wagner in U.S. Pat. No. 4,102,075, describes an intake coupled to a fluid diffuser chamber from which water exhausts via several exhaust ports. By creating the fluid diffuser chamber with predetermined dimensions, the lure produces sounds designed to attract fish. A fourth lure is described by Raymond Sullivan in U.S. Pat. No. 4,438,583. The Sullivan patent describes a fishing lure having an intake, an offset exhaust port and a baffle to produce vibrational noise.

Although all of the above-described fishing lures are adapted to produce vibrational sounds from fluid passing through the center of the lure, all of the devices produce extraneous noise related to water turbulence as water passes over the bodies of the lures. This extraneous noise detracts from the sounds associated with fluid flowing through the lure. Additionally, the attachment of the hooks to the bodies of the lures produces undesirable high frequency sounds from the hooks contacting the bodies. The difficulties encountered hereinabove are sought to be eliminated by the present invention.

SUMMARY OF THE INVENTION

The present invention comprises a fishing lure for producing a sound attracting vibration in a fluid as the fishing lure is pulled through the fluid. A streamlined body is provided, whereby the streamlined body, when pulled through a fluid such as water, produces substantially inaudible sound generating turbulence. Means are provided through the body for manipulating a portion of the fluid passing through the body into producing audible vibrations of a pre-determined wave length. A hook is also secured to the body.

In the preferred embodiment, the body is provided with a head and a foot. A fluid intake is provided near the head and a fluid exhaust is provided near the foot. A shaft connects the intake and exhaust. The shaft is designed to cause a fluid entering the shaft at a first speed to exit the shaft at a second greater speed. The shaft is also designed to cause the fluid passing through the shaft to produce vibrations at a predetermined frequency. The body is provided with a hook and is streamlined in a manner which substantially eliminates sound generating turbulence as the body is pulled through the fluid. The shaft preferably narrows as it extends from the intake to the exhaust. By manipulating the design of the shaft, the shaft produces fluid dynamics which cause the fluid to produce vibrations of a predetermined frequency. The hook is rigidly secured to the body to prevent extraneous noise associated with prior art treble hooks contacting the body of the lure.

BRIEF DESCRIPTION OF THE DRAWINGS

FIG. 1 is a top perspective view of the improved lure of the present invention;

FIG. 2 is a bottom perspective view of the improved lure of FIG. 1;

FIG. 3 is a side elevation in partial phantom of the improved lure of FIG. 1;

FIG. 4 is a rear perspective view of the improved lure of FIG. 1;

FIG. 5 is a top perspective view of an alternative floating embodiment of the improved lure of the present invention;

FIG. 6 is a top view in partial phantom of the improved floating lure of FIG. 5;

FIG. 7 is a bottom perspective view in partial phantom of the improved lure of FIG. 5;

FIG. 8 is a rear perspective view of another alternative embodiment of the present invention shown in partial phantom; and FIG. 9 is a front perspective cross-sectional view of the improved lure of FIG. 8.

DETAILED DESCRIPTION OF THE PREFERRED EMBODIMENT

With reference to the drawings, shown in FIG. 1 is an improved lure (10) having a body (12). Although the body (12) may be constructed of any suitable material known in the art, in the preferred embodiment, the body (12) is injection molded of Acrylonitrile-butadiene-styrene (ABS) into a shape having a head (13) consisting of a top face (14) and a bottom face (16). The body (12) is also provided with an underside (18) having a hook retainer (20), a foot (22), a back (24), a top (26), an eye mount (28), and a pair of sides (30) and (32). The top face (14) is 28.57 millimeters (1.125 in.) long and angled 50 degrees relative to the bottom face (16), which is 21.76 millimeters (0.857 in.) long. The bottom face (16) is angled 135 degrees relative to the underside (18), which is 36.42 millimeters (1.434 in.) long. The underside (18) is angled 18 degrees relative to the foot (22), which is 5.08 millimeters (0.20 in.) long. The back (24) is angled 21 degrees relative to the top (26), which is 19.05 millimeters (0.75 in.) long and angled 23 degrees relative to the top face (14). The eye mount (28) is centered on the top (26), 5.84 millimeters (0.23 in.) high, 1.52 millimeters (0.06 in.) thick, and provided with sides planar with both the top face (16) and the back (24). The body (12) is 12.7 millimeters (0.5 in.) thick. As shown in FIG. 1, a steel eye (34) is screwed into the eye mount (28) for attachment of the lure (10) to a fishing line (not shown).

As shown in FIG. 2, a hook (36) is provided having an eye (38), a shank (40), and a point (42). The hook (36) is provided through the hook retainer (20) and secured to the underside (18) of the lure (10) by a screw (44) passing through the eye (38) of the hook (36) and into the underside (18) of the lure (10). In the preferred embodiment, the hook (36) is secured to the underside (18) of the lure (10) securely enough so as to prevent the hook (36) from audibly striking the underside (18) of the lure (10) as the lure (10) is pulled through water (45).

As shown in FIG. 3, a tail (46) is integrally molded into the foot (22) of the body (12). The tail is preferably one millimeter thick. While the tail (46) may be constructed of any suitable material, in the preferred embodiment the tail (46) is constructed of a thin sheet of Santoprene, manufactured by Advanced Elastomer Systems of Akron, Ohio. The tail (46), of course, may be constructed of any suitable material. As shown in FIG. 4, the foot (22) is provided with an exhaust port (48) bisected by the tail (46).

As shown in FIG. 3, the lure (10) is also provided with a weight (51) extending through the body (12) and extending into protrusions (53) provided on the sides (30) and (32). Preferably, the protrusions (53) are positioned on the sides (30) and (32) of the lure so as to resemble eyes. The weight (51) is 16.25 millimeters (0.64 in.) long, 8.12 millimeters (0.32 in.) in diameter, and 6.38 grams. Although the weight (51) may be positioned in any suitable orientation, in the preferred embodiment, the weight (51) is positioned 5.08 millimeters (0.20 in) from the bottom face (16), 6.35 millimeters (0.25 in.) from the top face (14), and 12.7 millimeters (0.50 in.) from the tip of the head (13).

As shown in FIG. 3, the body (12) of the lure (10) is molded with a shaft (50) running from an intake port (52) to the exhaust port (48). As shown in the preferred embodiment, the intake port (52) is larger than the exhaust port (48) thereby forcing water (45) moving through the shaft (50) to increase in velocity as the water (45) moves from the intake port (52) to the exhaust port (48). In the preferred embodiment, the intake port (52) is 9.52 millimeters (0.375 in.) in diameter and the exhaust port (48) is 4.44 millimeters (0.175 in.) in diameter. The center of the exhaust port (48) is located 19.05 millimeters (0.75 in.) from the tip of the head (13). The shaft (50) is provided with a bend (54) to divert fluid moving through the shaft (50) toward the exhaust port (48). In the preferred embodiment, the diameter of the shaft (50) at the bend is 7.62 millimeters (0.30 in.). The angle at which the axial line of the intake port (52) intersects the axial line of the exhaust port (48) is 22 degrees.

When it is desired to use the lure (10) of the present invention, a fishing line (not shown) is secured through the eye (34) and the lure (10) is cast into the water (45). The lure (10) is then pulled through the water (45), thereby causing the top face (14) to contact the water and force the lure (10) downward. The faster the lure (10) is retrieved, the more quickly the lure (10) moves downward in the water (45). As the lure (10) is drawn through the water (45), the water (45) moves through the intake port (52), through the shaft (50), and steadily increases in velocity before it exits through the exhaust port (48). The dimensions of the intake port (52) shaft (50) and exhaust port (48) are preferably designed to produce vibration of less than 1000 Hertz and, more preferably, to produce vibration of less than 500 Hertz. The dimensions of the intake port (52), shaft (50), exhaust port (48) of the preferred embodiment are designed to produce vibration of 100 Hertz, designed to attract Bass fish.

Notably, the body (12) is provided with rounded corners, a streamlined body (12) and a hook (36) securely attached to the body (12) to substantially eliminate sound generating turbulence of water (45) passing over the body (12). Turbulence is reduced to the point where it does not substantially reduce the effectiveness of the fish attracting frequencies generated by water (45) moving through the shaft (50). The dimensions of both the body (12) and shaft (50) can be manipulated through trial and error to produce lures of various shapes generating other desired frequencies. Two alternative embodiments of the preferred embodiment are described below.

Shown in FIG. 5 is an alternative lure (56) of the present invention. The lure (56) is provided with a cylindrical body (58), having a fluid intake (60) and a pair of fluid exhausts (62) and (64). As shown in FIG. 6, the fluid intake (60) opens into a shaft (66). The shaft (66) opens into a diverter (68), which diverts fluid passing through the shaft (66) into two exhaust pipes which open into the respective fluid exhausts (62) and (64). In the preferred embodiment, the diameter of the body (58) is 15.87 millimeters (0.625 in.), the diameter of the fluid intake (60) is 6.35 millimeters (0.25 in.), the diameter of the shaft is 13.33 millimeters (0.525 in.), the diameter of the exhaust pipes (70) and (72) are 7.92 millimeters (0.312 in.), and the diameter of the fluid exhausts (62) and (64) are 6.35 millimeters (0.25 in.).

As shown in FIG. 7, the body (58) is provided with a hollow portion of semicircular cross-section. The bottom of the hollow portion is 6.35 millimeters (0.25 in.), across. The hollow portion (74) provides buoyancy to the body (58) to allow the lure (56) to rest on the surface of the water (45) and emulate a frog. As shown in FIG. 7, the hollow portion (74) may be provided with steel bearings (75) or the like to produce a rattle as the body (58) is operated. As shown in FIG. 5, secured to the cylindrical body (58) are an eyelet (76) and a hook (78). As with the preferred embodiment, the hook (78) is secured to the cylindrical body (58) sufficiently to prevent sound from being produced by the hook (78) coming into and out of contact with the cylindrical body (58).

Although the invention has been described with respect to a preferred embodiment thereof, it is to be understood that it is not to be so limited, since changes and modifications can be made therein which are within the full intended scope of this invention as defined by the appended claims. For example, it is anticipated that various rattles, spinners, scents and colors may be used in association with the present invention to increase the attractiveness of the lure (10) to gamefish. It is further anticipated that the body (12) may be constructed with alternative streamlined dimensions.

What is claimed is:

1. A fishing lure for producing a sound attracting vibration in a fluid as the fishing lure is pulled through the fluid, said fishing lure comprising:
   a. streamlined body whereby said body substantially eliminates sound generating turbulence of the fluid as the body is pulled through the fluid;
   b. means provided through said body for manipulating a portion of the fluid passing through the body into producing vibrations of a pre-determined wavelength;
   c. hook secured to said body;
   d. means for securing said hook against movement relative to said body after said hook is struck by a fish; and
   e. wherein said body and said hook are of a construction and orientation which produces substantially no audible noise as the lure is pulled through the fluid, other than said vibrations of said pre-determined wavelength.

2. The fishing lure of claim 1, wherein said pre-determined frequency is about 100 hertz.

3. The fishing lure of claim 1, further comprising means for substantially preventing audible contact between said body and said hook as said body is pulled through the fluid.

4. The fishing lure of claim 3, wherein said preventing means is means for rigidly securing said hook to said body.

5. The fishing lure of claim 1, wherein said manipulating means is a fluid intake and a fluid exhaust coupled by a shaft.

6. The fishing lure of claim 5, wherein said fluid intake, said shaft, and said fluid exhaust are constructed in a manner whereby the fluid exits said fluid exhaust at a higher velocity than the fluid enters said fluid intake.

7. The fishing lure of claim 1, wherein said manipulating means is a fluid intake and a plurality of fluid exhausts, coupled by a shaft.

8. The fishing lure of claim 7, wherein said fluid intake, said shaft, and said plurality of fluid exhausts are constructed in a manner whereby the fluid exits said plurality of exhausts at a higher velocity than the fluid enters said fluid intake.

9. The fishing lure of claim 1, further comprising a weight secured to said body, wherein said weight has a greater density than said body.

10. The fishing lure of claim 1, further comprising means provided within said body for producing a rattle as said body is pulled through the fluid.

11. The fishing lure of claim 1, further comprising a sound-producing material provided within a cavity, said cavity being provided within said body.

12. The fishing lure of claim 11, wherein said sound producing material is at least one bearing.

13. The fishing lure of claim 1, further comprising fluid diverting means provided on said body for diverting the fluid over said body and for forcing said body downward as said body is drawn through the fluid.

14. A fishing lure for producing a sound attracting vibration in a fluid as the fishing lure is pulled through the fluid, said fishing lure comprising:

a. a body having a head and a foot, said body being of a streamlined construction, whereby said body produces substantially inaudible sound generating turbulence as said body is pulled through the fluid;

b. a fluid intake provided near said head of said body;

c. a fluid exhaust provided near said foot of said body;

d. a cylindrical wall forming a frequency producing shaft through said body and connecting said intake to said exhaust, whereby the fluid entering said intake enters at a lower velocity than the fluid exits through said exhaust, and whereby the fluid passing through said shaft produces vibrations at a pre-determined frequency;

e. a hook secured to said body; and f. means for securing said hook against movement relative to said body after said hook is struck by a fish.

15. The fishing lure of claim 14, wherein said pre-determined frequency is about 100 hertz.

16. The fishing lure of claim 14, wherein said body and said hook are of a construction and orientation which produces substantially no audible noise as the lure is pulled through the fluid, other than said vibrations at said pre-determined frequency.

17. The fishing lure of claim 14, further comprising means for substantially preventing audible contact between said body and said hook as said body is pulled through the fluid.

18. The fishing lure of claim 17, wherein said preventing means is means for rigidly securing said hook to said body.

19. The fishing lure of claim 14, further comprising means for securing said hook against movement relative to said body after said hook is struck by a fish.

* * * * *